United States Patent [19]

Smith

[11] Patent Number: 5,722,557
[45] Date of Patent: Mar. 3, 1998

[54] FIRE EXTINGUISHER ENCLOSURE

[76] Inventor: Richard D. Smith, 1613 LaGenia Ct., Dalton, Ga. 30721

[21] Appl. No.: 743,301

[22] Filed: Nov. 5, 1996

[51] Int. Cl.$^6$ ............................................. B60R 11/00
[52] U.S. Cl. ............................................. 220/476; 206/583
[58] Field of Search ........................ 220/3.9, 476, 737; 206/583

[56] References Cited

U.S. PATENT DOCUMENTS

| | | | |
|---|---|---|---|
| 1,224,234 | 5/1917 | Taber | 220/657 X |
| 1,350,397 | 8/1920 | Wachter | 220/476 X |
| 1,982,957 | 12/1934 | Knell | 220/3.9 |
| 2,608,339 | 8/1952 | Benzon-Petersen | 206/583 |
| 2,739,733 | 3/1956 | Larson | 220/476 X |
| 2,805,724 | 9/1957 | Aprea | 220/476 X |
| 3,451,580 | 6/1969 | Husby | 220/4 |
| 4,182,455 | 1/1980 | Zurawin | 211/71 |
| 4,303,218 | 12/1981 | Naegeli | 248/146 |
| 4,424,907 | 1/1984 | Robb | 211/60 R |
| 4,446,660 | 5/1984 | Miller et al. | 52/36 |
| 4,458,019 | 7/1984 | Chrisope | 435/243 |
| 4,699,437 | 10/1987 | Genereaux | 312/248 |
| 4,700,849 | 10/1987 | Wagner | 211/71 |
| 5,102,020 | 4/1992 | Walker et al. | 220/476 X |
| 5,242,219 | 9/1993 | Tomaka | 312/245 |

*Primary Examiner*—Steven M. Pollard
*Attorney, Agent, or Firm*—Akin, Gump, Strauss, Hauer & Feld, L.L.P.

[57] ABSTRACT

A fire extinguisher enclosure, particularly adapted for supporting a cylindrical tank fire extinguisher underslung from warehouse, warehouse-type retail store and industrial goods support racking includes an elongated, generally rectangular or cylindrical tubular body folded along a bottom side to form a cradle for the fire extinguisher. The body is open at one end and is connected to a flanged, generally planar support member engageable with a horizontal beam part of said racking structure. The opposite end of the enclosure includes a generally planar upstanding support plate having a transverse flange for connection to a second, generally horizontal support beam of the racking structure. The enclosure is adapted for easy access and high visibility while providing an out-of-the-way storage place for fire extinguishers required in installations wherein a vertical wall or other structure is not available or is undesirable for supporting a fire extinguisher.

13 Claims, 2 Drawing Sheets

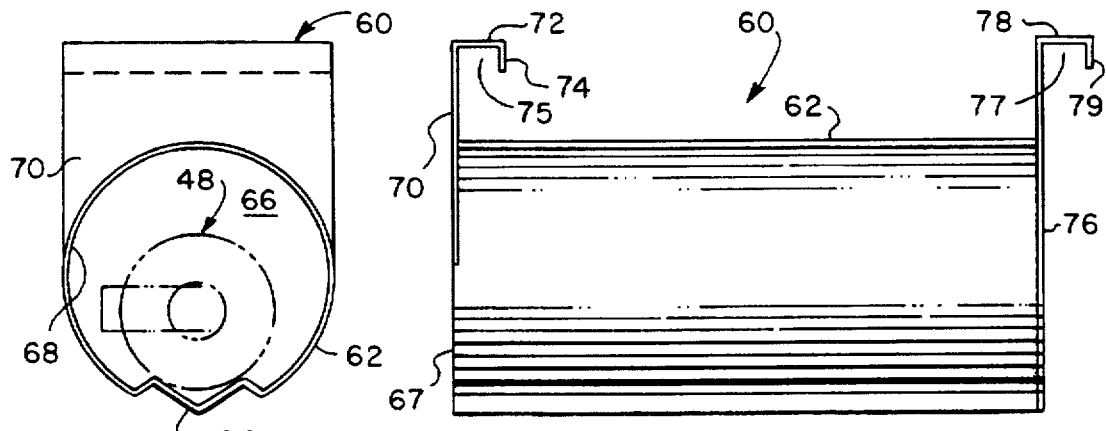
FIG. 2
FIG. 3
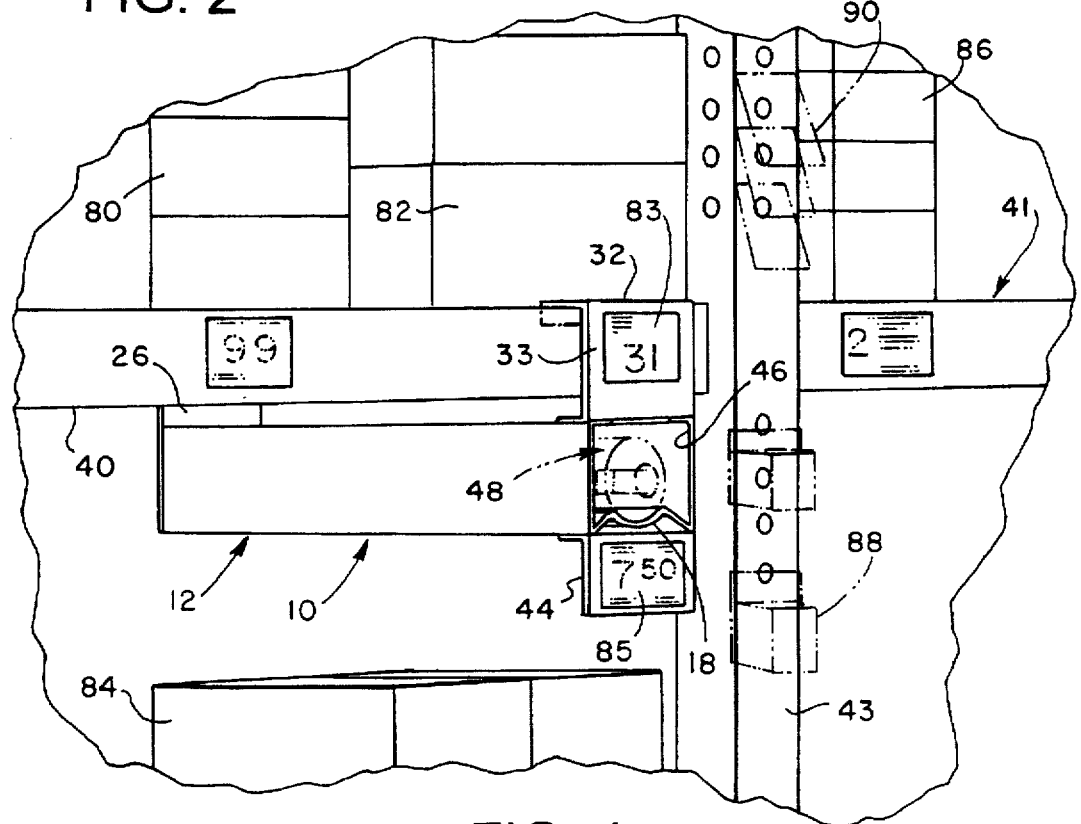
FIG. 4

FIRE EXTINGUISHER ENCLOSURE

FIELD OF THE INVENTION

The present invention pertains to a fire extinguisher enclosure, particularly adapted for supporting a chemical tank-type fire extinguisher in a generally horizontal position on a warehouse-type rack structure and the like.

BACKGROUND

Fire extinguishing equipment, including cylindrical tank chemical pressure discharge-type fire extinguishers; should, of course, be disposed where such is readily accessible and highly visible. In commercial and industrial buildings, in particular, fire prevention regulations require that fire extinguishers be disposed in predetermined positions throughout the building interior. For example, in generally open warehouse and industrial-type buildings a fire extinguisher must be located within a predetermined floor area of the building. However, for large open interior buildings, such as warehouses, warehouse-type retail stores and large open industrial and manufacturing facilities, vertical walls and similar structures for supporting fire extinguishers in positions away from the perimeter walls of the building are not available. However, warehouse buildings, warehouse retail stores and many manufacturing facilities often have substantial amounts of grid-like storage rack-type structures dispersed throughout the open interior of the building which can provide means for supporting fire extinguishers in the requisite predetermined positions throughout the building.

In warehouse facilities and warehouse-type retail stores it is also inconvenient and otherwise undesirable to mount support brackets and the like for fire extinguishers on the vertical column members of warehouse racking since these column members are, for example, often used for supporting displays of goods in retail stores. Moreover, in many warehouse facilities and warehouse-type retail stores it is undesirable to support a fire extinguisher in a position wherein it may be inadvertently struck by a passing vehicle or a person carrying large and bulky goods through the aisles formed between the goods support racking and the like.

Accordingly, there has been a need to develop improvements in support structure for fire extinguisher apparatus, particularly in environments of the type discussed hereinabove. It is to these ends that the present invention has been developed.

SUMMARY OF THE INVENTION

The present invention provides an enclosure and support structure for a portable chemical tank-type fire extinguisher and the like.

In accordance with one aspect of the present invention, a support and enclosure for a chemical tank fire extinguisher is provided which is adapted for supporting the fire extinguisher in a generally horizontal position supported on industrial warehouse or warehouse-type retail store storage racking, in particular.

In accordance with another important aspect of the invention, a fire extinguisher enclosure is provided which is operable to support a fire extinguisher underslung from generally horizontally-extending spaced apart support members of warehouse racking, and similar structures, such as ceiling rafters or beams and other support structure wherein the enclosure may be disposed out of harm's way, but is easily accessible and may be supported in a position which is highly visible.

In accordance with still another aspect of the invention, a fire extinguisher enclosure is provided which is particularly adapted for support on retail store goods storage racking in warehouse-type retail stores wherein the enclosure is easily accessible and highly visible, but is supported in an available, out-of-the-way position such as to not interfere with the display of goods and/or descriptive and price labeling for the goods.

In accordance with yet a further aspect of the present invention, a fire extinguisher enclosure is provided which is easily fabricated, is adapted to support a cylindrical tank chemical-type fire extinguisher in an easily accessible position for placing the extinguisher in use when needed or for inspecting the fire extinguisher when required, and is configured to support the extinguisher in a stable position out of harm's way. The enclosure is conveniently fabricated of folded and welded metal plate, for example, is of uncomplicated construction and is adapted for rapid and easy installation or removal from warehouse and industrial goods-type support and storage racking and the like.

Those skilled in the art will further appreciate the above-mentioned aspects of the present invention together with other superior features thereof upon reading the detailed description which follows in conjunction with the drawing.

BRIEF DESCRIPTION OF THE DRAWING

FIG. 2 is an end view of another preferred embodiment of a fire extinguisher enclosure in accordance with the invention;

FIG. 3 is a side elevation of the enclosure embodiment shown in FIG. 2; and

FIG. 4 is a perspective view showing a typical installation of the enclosure of the invention on goods support racking for a warehouse-type retail store.

DESCRIPTION OF THE PREFERRED EMBODIMENTS

Figure 1:
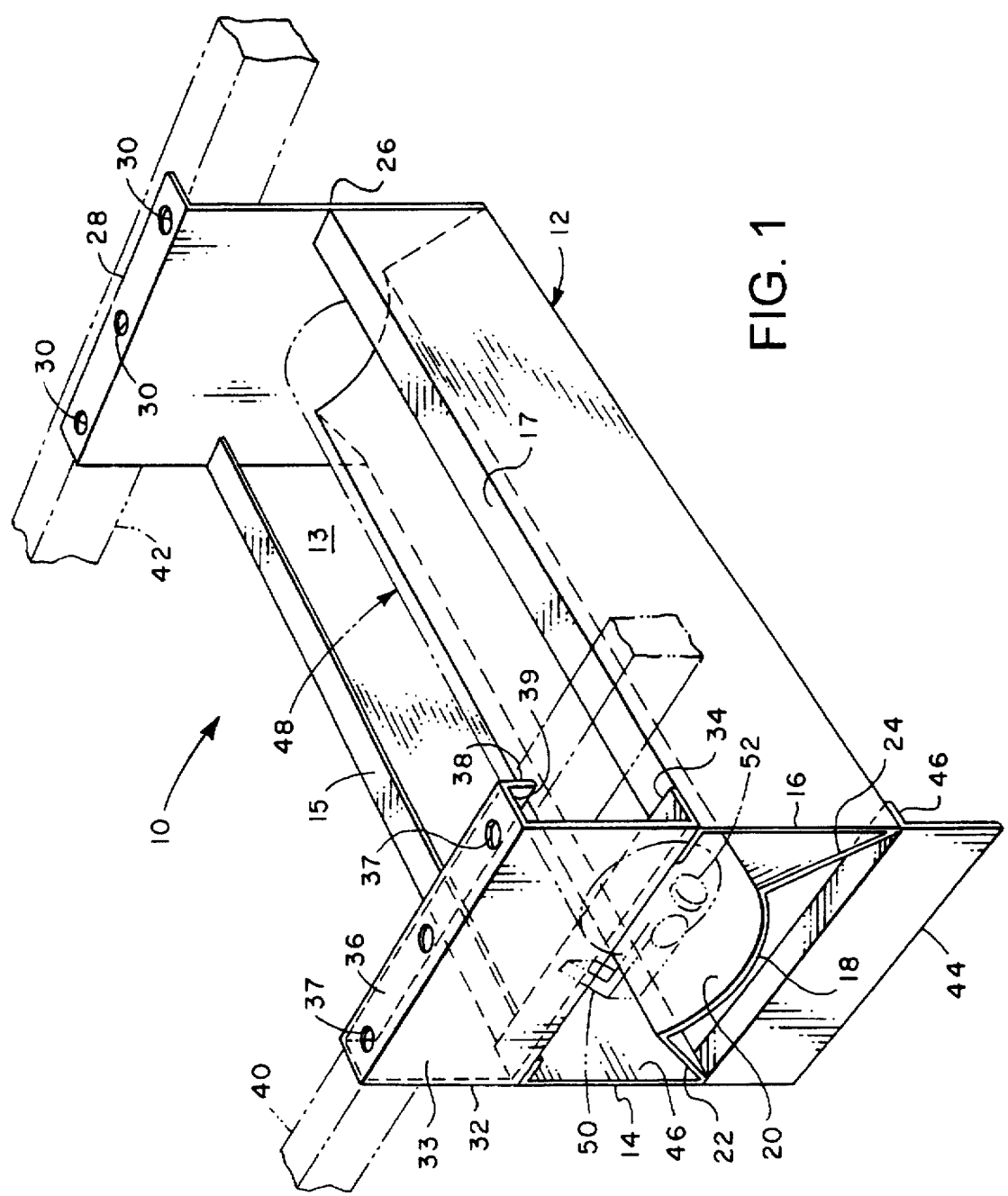
FIG. 1 is a perspective view of one preferred embodiment of a fire extinguisher enclosure in accordance with the invention.

In the description which follows, like parts are marked throughout the specification and drawing with the same reference numerals, respectively. The drawing figures may not necessarily be to scale and certain elements may be shown in somewhat generalized or schematic form in the interest of clarity and conciseness.

Referring to FIG. 1, there is illustrated a fire extinguisher enclosure and support in accordance with the present invention and generally designated by the numeral 10. The enclosure 10 comprises a generally rectangular, elongated body member 12 defining an interior space 13. Body member 12 includes opposed generally planar and parallel upstanding sidewalls 14 and 16 which are interconnected by a bottom wall 18. Bottom wall 18 comprises a somewhat arcuate concave cradle portion 20 and opposed web portions 22 and 24 which interconnect the cradle portion 20 with the sidewalls 14 and 16, respectively. The opposed sidewalls 14 and 16 also terminate at respective generally horizontally extending opposed flange portions 15 and 17. One end of the enclosure body 12 is closed by a generally vertically extending support member or endplate 26 which is secured to the body 12 along portions thereof which are contiguous with the endplate in a suitable manner, such as by welding at such contiguous surfaces. The endplate 26 is provided with a generally horizontally extending distal flange portion 28 which may have a plurality of fastener receiving holes 30 formed therein and spaced apart therealong, as shown.

The opposite end of the enclosure 10 is also provided with an upstanding support member 32 comprising a metal plate which is folded at one end to form a flange 34 for engagement with and securement to the flanges 15 and 17 in a conventional manner, such as by welding or by mechanical fasteners, not shown. The opposite end of the support 32 is folded to form a support web 36 and a depending flange 38 defining a channel 39 which may provide for engagement with a generally horizontally extending beam 40 of a warehouse rack-type support structure, for example. The web 36 is preferably coplanar with flange 28 and includes plural spaced apart fastener receiving holes 37 formed therein. As also shown in FIG. 1, the endplate 26 is also adapted to be supported on a second generally horizontally extending beam 42 of the aforementioned racking or support structure which is spaced from and generally parallel to beam 40.

As further shown in FIG. 1, the enclosure 10 may also be provided with a depending support plate 44 having a generally laterally extending flange part 46 which may be suitably secured to the lower side edges of the sidewalls 14 and 16, such as by welding. The support plate 44 as well as the vertically extending planar plate portion 33 of the support 32 are disposed adjacent an opening 46 in the end of enclosure body 12 opposite the endplate 26 wherein a conventional cylindrical tank pressure discharge chemical-type fire extinguisher 48 may be disposed in interior space 13 and may be easily accessible for removal from the enclosure 10 through the opening 46 when needed. The fire extinguisher 48 may, typically, be stored nested in the cradle portion 20 with its operating handle portion 50 disposed adjacent the opening 46 for easy access, when needed. The radius of curvature of cradle 20 may be only slightly larger than that of the fire extinguisher 48 to prevent rolling of the extinguisher in the enclosure 10. Moreover, elements of the fire extinguisher 48, such as its working pressure gauge 52, may be easily viewed from the opening 46 without removing the fire extinguisher from the enclosure.

The fire extinguisher enclosure 10 may be conveniently fabricated of metal plate, such as low carbon steel or aluminum of a suitable wall thickness of about 0.06 inches. The enclosure 10 may have an overall length of about 22.0 inches, a height of the sidewalls 14 and 16 of about 6.0 inches and a width of about 9.0 inches, for example. The overall height from the lower side edges of walls 14 and 26 to the flange 28 may be about 12.0 inches. The enclosure 10 is preferably painted of a high visibility color such as yellow or red in either solid color or with suitable high visibility striping. The front plate member 44 and the plate portion 33 of the support member 32 are preferably coplanar and may have suitable indicia printed thereon, such as instructions for operating the extinguisher and/or, in certain installations, such as in retail stores and the like, pricing information for goods supported on the rack structure adjacent to the fire extinguisher may be conveniently displayed thereon.

The embodiment of the fire extinguisher enclosure 10 illustrated in FIG. 1 is easily fabricated by forming the body 12 of a single metal plate part, for example, which may be folded to form the sidewalls 14 and 16, the bottom wall 18 and the opposed flanges 15 and 17 which add to the rigidity of the body 12 the top side of the enclosure body 12 may be left open, as shown in FIG. 1, to provide alternate viewing of and access to fire extinguisher 48, if needed. The enclosure 10 may be easily fabricated, as mentioned above, by welding the end plate 26 to one end of the body 12 and welding the support 32 and the depending plate 44 to the opposite end of the body 12, in the positions shown in FIG. 1. Mechanical fasteners may, of course, be used in place of welding.

The enclosure 10 may be quickly and conveniently installed in a working position, as shown in FIG. 1, extending between horizontal beam members of warehouse-type rack structure. The dimensions of the enclosure 10 may be designated to comply with standard or conventional spacing between the beams 40 and 42, since a substantial amount of industrial and warehouse-type rack structure is fabricated to predetermined, so-called standard dimensions. However, the enclosure 10 may be fabricated in several different standard sizes to accommodate different warehouse rack beam spacings and to accommodate different sizes of fire extinguishers, such as the fire extinguisher 48. The enclosure 10 may be more permanently secured to beams 40 and 42 by fasteners, not shown, extending through fastener holes 37 and 30. The flange 28 and web 36 may also be secured by fasteners, not shown, to the underside of beams or the like, if desired.

Referring now to FIGS. 2 and 3, another embodiment of a fire extinguisher enclosure and support is illustrated and generally designated by the numeral 60. The enclosure 60 is similar in some respects to the enclosure 10 and includes an elongated, generally cylindrical tubular body 62 which may be suitably die formed, for example, to have a generally "V"shaped cradle portion 64, FIG. 2, for supporting a fire extinguisher 48 within an interior space 66 of the body 62 in a way which minimizes or prevents rolling movement of the extinguisher to and from in the enclosure. The body 62 is open at a forward end 67 as defined by an opening 68. A forward generally planar support plate 70 is disposed at the forward end 67 extending generally vertically or transversely from the body 62 and including a generally horizontally extending web portion 72 and depending flange 74 forming a channel 75.

The opposite end of the enclosure 60 includes an upstanding support member 76 formed by a generally flat plate having a distal transverse web 78 and depending flange 79 formed at the upper end thereof and defining a channel 77. The enclosure 60, including the support members 70 and 76, may be adapted to engage the beams 40 and 42 in channels 75 and 77. The upstanding end plate 76 closes the end of the body 62 opposite the end 67 to prevent inadvertent displacement of a fire extinguisher rearwardly out of the enclosure. The support plates 70 and 76 may be suitably secured to the body 62, such ashy welding, and the components of the enclosure 60 may also be formed of suitable metal plate fabricated in accordance with conventional manufacturing methods. The general outline or overall dimensions for enclosure 60 may be similar to that of enclosure 10. The enclosure 60 may also, preferably, be painted in a high visibility color for easy identification when installed in its working position.

Referring now to FIG. 4, there is illustrated a typical installation of a fire extinguisher enclosure in accordance with the invention, such as the enclosure 10. The enclosure 10 is shown installed in a working position on warehouse retail store racking 41 which includes spaced apart upstanding column members 43, one shown, between which the generally horizontal beams 40 and 42 extend, respectively, to form a generally rectangular three dimensional grid-like support structure for retail goods such as packaged goods 80, 82, 84, 86 and packaged goods 88 and 90 which are shown supported on the column member 43 for attractive display and easy access for inspection and purchase. Accordingly, particularly in retail store outlets, it is not desirable to mount fire extinguishers on the column members 43 since these members are advantageously used for displaying goods for sale. Moreover, in many warehouse facilities and warehouse-type retail stores, passing vehicles, such as lift trucks and the like, would make the location of a fire extinguisher extending outwardly from the support column 43 particularly vulnerable to damage. Accordingly, an enclosure such as the enclosure 10 adapted to mount in the position shown in FIG. 4, for example, is particularly advantageous.

The enclosures 10 and 60 may be mounted in positions which are easily accessible and highly visible and yet may be disposed in out-of-the-way positions with respect to the movement of goods onto and off of the support structure 41, as shown by way of example. FIG. 4 also illustrates how the support plate 44 and the plate portion 33 of the upstanding support 32 may be advantageously used to place suitable indicia 83 and 85, such as pricing information for the goods 82 and 84, on these members.

Those skilled in the art will recognize from the foregoing description that a particularly advantageous enclosure has been developed for fire extinguishers, particularly for use in warehouse-type retail stores, commercial warehouses and other industrial facilities where storage of fire extinguishers in areas where required may otherwise be difficult.

Although preferred embodiments of the invention have been described in detail herein, those skilled in the art will also recognize that various substitutions and modifications may be made to the invention without departing from the scope and spirit of the appended claims.

What is claimed is:

1. A fire extinguisher enclosure, particularly adapted for supporting a tank-type chemical fire extinguisher in a generally horizontal position on a structure, said enclosure comprising:

an elongated body open at one end and adapted for supporting a fire extinguisher in a generally horizontal position in an interior space of said body, said body including a bottomwall portion comprising spaced apart webs and a concave intermediate part between said webs for cradling said fire extinguisher to minimize rolling movement of said fire extinguisher within said body during storage therein;

a first upstanding support member connected to said body at substantially the opposite end thereof and forming a closure for said opposite end, said first support member including means for engagement with said structure for supporting said body underslung from said structure; and a second upstanding support member connected to said body and spaced from said first support member and including means for engagement with said structure for supporting said body underslung from said structure.

2. The enclosure set forth in claim 1 wherein:

said first support member has a generally transverse flange formed thereon for engagement with said structure.

3. The enclosure set forth in claim 1 wherein:

said second support member includes a web portion and a depending flange forming a channel for engagement with said structure.

4. The enclosure set forth in claim 1 wherein:

said body comprises a generally cylindrical tube member.

5. The enclosure set forth in claim 1 wherein:

said body comprises opposed upstanding sidewalls connected to said webs, respectively, and said fire extinguisher being supported between said webs and said sidewalls.

6. The enclosure set forth in claim 5 wherein:

said body is formed by a metal plate which is folded to form said webs, said intermediate part forming said cradle and said sidewalls, respectively.

7. The enclosure set forth in claim 6 wherein:

said sidewalls include opposed transverse flange portions delimiting an upper edge of said sidewalls, respectively, and extending between said support members.

8. The enclosure set forth in claim 1 including:

a depending, generally planar plate member disposed adjacent said open end of said body for supporting indicia thereon.

9. A fire extinguisher enclosure for a tank-type fire extinguisher, particularly adapted to support said fire extinguisher in a generally horizontal position between spaced apart beam members, said enclosure comprising:

an elongated body open at one end and adapted to support said fire extinguisher in said generally horizontal position in an interior space of said body, said body including opposed elongated webs and an intermediate part between said webs for cradling said fire extinguisher in said interior space to minimize rolling movement of said fire extinguisher while permitting rapid unrestrained withdrawal of said fire extinguisher through said open end of said body;

a first upstanding support member connected to said body at substantially one end thereof and including means for supporting said body underslung from one of said beam members;

a second upstanding support member connected to said body and spaced from said first support member and including means for engaging the other of said beam members at a point spaced from said first support member for supporting said enclosure underslung from said beam members and for supporting said fire extinguisher in a substantially horizontal position, said second upstanding support member forming a closure for an end of said body opposite said one end.

10. The enclosure set forth in claim 9 wherein:

each of said support members includes a flange portion including spaced apart fastener receiving openings therein, respectively.

11. The enclosure set forth in claim 9 wherein:

said body comprises opposed upstanding sidewalls and opposed transverse flange portions delimiting an upper edge of said sidewalls, respectively, and extending between said support members.

12. The enclosure set forth in claim 9 wherein:

said body comprises a generally cylindrical tube member.

13. The enclosure set forth in claim 9 including:

a depending, generally planar plate member disposed adjacent said one end of said body for supporting indicia thereon.

* * * * *